(12) United States Patent
Jang et al.

(10) Patent No.: US 9,992,715 B2
(45) Date of Patent: *Jun. 5, 2018

(54) IN-DEVICE COEXISTENCE INTERFERENCE REPORT CONTROL METHOD AND APPARATUS OF NETWORK IN MOBILE COMMUNICATION SYSTEM

(71) Applicant: Samsung Electronics Co., Ltd., Suwon-si, Gyeonggi-do (KR)

(72) Inventors: Jaehyuk Jang, Suwon-si (KR); Soenghun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

This patent is subject to a terminal disclaimer.

(21) Appl. No.: 14/850,254

(22) Filed: Sep. 10, 2015

(65) Prior Publication Data

US 2015/0382256 A1 Dec. 31, 2015

Related U.S. Application Data

(63) Continuation of application No. 14/638,409, filed on Mar. 4, 2015, now Pat. No. 9,167,483, which is a
(Continued)

(51) Int. Cl.
H04W 36/00 (2009.01)
H04W 36/20 (2009.01)
(Continued)

(52) U.S. Cl.
CPC ... H04W 36/0083 (2013.01); H04W 36/0016 (2013.01); H04W 36/0066 (2013.01);
(Continued)

(58) Field of Classification Search
CPC ............................ H04W 24/10; H04W 28/048
See application file for complete search history.

(56) References Cited

U.S. PATENT DOCUMENTS 6,370,390 B1 4/2002 Salin et al.
8,638,705 B2 1/2014 Park et al.
(Continued)

FOREIGN PATENT DOCUMENTS

CN 1229562 A 9/1999
CN 101682896 A 3/2010
(Continued)

OTHER PUBLICATIONS

Huawei et al., The MDT applicability of EPLMN, 3GPP Change Request; R2-114011, 3GPP TSG-RAN WG2 075, Athens, Greece, pp. 1-16, Aug. 22, 2011 to Aug. 26, 2011.
(Continued)

*Primary Examiner* — Raj Jain
*Assistant Examiner* — Chuong M Nguyen
(74) *Attorney, Agent, or Firm* — Jefferson IP Law, LLP

(57) ABSTRACT

An in-device coexistence interference report control method of a network for terminal to inform the network of interference among heterogeneous radio communication modules coexisting in the terminal is provided. The method includes determining, at a terminal when a terminal capability enquiry message is received from a base station, whether the base station supports an In-Device Coexistence (IDC) interference report, transmitting, when the IDC interference report is supported, a terminal capacity information message to the base station, receiving a Radio Resource Control (RRC) connection reconfiguration message including information on whether terminal's IDC interference indicator transmission is permitted from the base station; and transmitting an RRC connection reconfiguration complete message to the base station in response to the RRC connection reconfiguration message. The in-device coexistence interference indication control method is advantageous in preventing the UE from transmitting useless in-device coexis-
(Continued)

tence interference indication messages, resulting in reduction of unnecessary signaling.

8 Claims, 8 Drawing Sheets

Related U.S. Application Data continuation of application No. 13/758,132, filed on Feb. 4, 2013, now Pat. No. 8,983,448.

(60) Provisional application No. 61/595,646, filed on Feb. 6, 2012.

(51) Int. Cl.
*H04W 36/14* (2009.01)
*H04W 48/16* (2009.01)
*H04W 84/04* (2009.01)
*H04W 72/04* (2009.01)
*H04W 76/04* (2009.01)
*H04W 36/38* (2009.01)
*H04W 88/06* (2009.01)
*H04W 88/10* (2009.01)

(52) U.S. Cl.
CPC ............ *H04W 36/14* (2013.01); *H04W 36/20* (2013.01); *H04W 36/38* (2013.01); *H04W 48/16* (2013.01); *H04W 72/048* (2013.01); *H04W 72/0413* (2013.01); *H04W 76/046* (2013.01); *H04W 84/042* (2013.01); *H04W 88/06* (2013.01); *H04W 88/10* (2013.01)

(56) References Cited

U.S. PATENT DOCUMENTS

| | | | |
|---|---|---|---|
| 8,649,288 B2 | 2/2014 | He et al. | |
| 8,792,417 B2 | 7/2014 | Yeoum et al. | |
| 8,838,046 B2* | 9/2014 | Fu ........................ | H04B 1/406 455/67.13 |
| 9,167,483 B2* | 10/2015 | Jang ...................... | H04W 36/20 |
| 2004/0053623 A1 | 3/2004 | Hoff et al. | |
| 2004/0180675 A1 | 9/2004 | Choi et al. | |
| 2006/0281466 A1 | 12/2006 | Gholmieh et al. | |
| 2007/0268877 A1 | 11/2007 | Buckley et al. | |
| 2008/0240439 A1 | 10/2008 | Mukherjee et al. | |
| 2009/0034452 A1 | 2/2009 | Somasundaram et al. | |
| 2009/0170498 A1 | 7/2009 | Venkatasubramanian et al. | |
| 2010/0069112 A1 | 3/2010 | Sun et al. | |
| 2010/0093386 A1 | 4/2010 | Damnjanovic et al. | |
| 2010/0118805 A1 | 5/2010 | Ishii et al. | |
| 2010/0296467 A1 | 11/2010 | Pelletier et al. | |
| 2010/0317356 A1 | 12/2010 | Roessel et al. | |
| 2011/0051609 A1 | 3/2011 | Ishii et al. | |
| 2011/0103328 A1 | 5/2011 | Lee et al. | |
| 2011/0170503 A1 | 7/2011 | Chun et al. | |
| 2011/0194505 A1 | 8/2011 | Faccin et al. | |
| 2011/0195668 A1 | 8/2011 | Lee et al. | |
| 2011/0249641 A1 | 10/2011 | Kwon et al. | |
| 2011/0250910 A1 | 10/2011 | Lee et al. | |
| 2011/0268024 A1 | 11/2011 | Jamp et al. | |
| 2011/0299415 A1 | 12/2011 | He et al. | |
| 2012/0020231 A1* | 1/2012 | Chen ..................... | H04W 36/08 370/252 |
| 2013/0090142 A1* | 4/2013 | Lee ...................... | H04B 1/0475 455/501 |
| 2013/0265866 A1 | 10/2013 | Yi et al. | |
| 2014/0242974 A1 | 8/2014 | Lee et al. | |

FOREIGN PATENT DOCUMENTS

| | | |
|---|---|---|
| CN | 101772928 A | 7/2010 |
| CN | 101841889 A | 9/2010 |
| CN | 102027798 A | 4/2011 |
| CN | 102098655 A | 6/2011 |
| CN | 102170644 A | 8/2011 |
| GB | 2461780 A | 1/2010 |
| KR | 10-2011-0000479 A | 1/2011 |
| KR | 10-2011-0091305 A | 8/2011 |
| KR | 10-2011-0093642 A | 8/2011 |
| RU | 2 262 811 C2 | 10/2005 |
| RU | 2 411 697 C2 | 2/2011 |
| RU | 2 426 251 C2 | 8/2011 |
| WO | 98/01004 A2 | 1/1998 |
| WO | 98/26625 A2 | 6/1998 |
| WO | 2008/137354 A1 | 11/2008 |
| WO | 2010/121662 A1 | 10/2010 |
| WO | 2010/124228 A2 | 10/2010 |
| WO | 2011/085802 A1 | 7/2011 |
| WO | 2011/093666 A2 | 8/2011 |
| WO | 2011/154761 A1 | 12/2011 |

OTHER PUBLICATIONS

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10), 3GPP TS 37.320, V10. 4.0, pp. 1-18, Dec. 2011.
TR 37.806 v1.1.0 change bars, R4-114382, Aug. 17, 2011.
3GPP TSG-RAN WG2 #75, R2-114299, Multiple frequency band indicators per cell, Aug. 16, 2011.
Pantech, IDC trigger procedure, Jan. 31, 2012, 3GPP Draft, R2-120664 IDC Trigger Procedure, 3rd Generation Partnership Project (3GPP), Mobile Competence Centre; 650, Route Des Lucioles, F-06921 Sophia-Antipolis Cedex, France, XP050565514, p. 1/5-5/5.
Research in Motion UK Limited, Interference measurement for BT, 3GPP Draft, R2-120183, 3rd Generation Partnership Project (3GPP), Mobile Competence Centre; 50, Route Des Lucioles, F-06921 Sophia-Antipolis Cedex, France, vol. RAN WG2, No. Dresden, Germany, Feb. 6-10, 2012, XP050564912, pp. 1-6.
"3rd Generation Partnership Project; Technical Specification Group Radio Access Network; Study on Minimization of drive-tests in Next Generation Networks; (Release 9)", 3GPP TR 36.805, V9.9.9, Dec. 2009, pp. 1-24.
"23.1 RRC Connection Establishment", published on Aug. 12, 2011 as per WayBack Machine, www.lte-bullets.com.
Nokia Corporation et al., "RACH and carrier aggregation", 3GPP Draft; R2-096844, Nov. 9, 2009.
Asustek, "Issues of Random Access procedure on SCell", 3GPP Draft; R2-112922, May 9, 2011.
Itri, "Considerations on Random Access on SCell", 3GPP Draft: R2-113192, May 9, 2011.
New Postcom, "Consideration on RA response window size for SCell", 3GPP Draft: R2-123485, XP050665586, Aug. 13, 2012.
Huawei et al., "Enabling SMS for PS-only", SA WG2 Meeting #87, S2-114586, Oct. 10-14, 2011, pp. 1-2, Jeju, Korea.
"3rd Generation Partnership Project; Technical Specification Group Services and System Aspects; Circuit Switched (CS) fallback in Evolved Packet System (EPS); Stage 2 (Release 10)", 3GPP TS 23.272 V110.5.0 (Sep. 2011), Aug. 24, 2011.
Alcatel-Lucent et al., "RA procedure on SCell", TSG-RAN WG2#77, R2-120603, Feb. 6-10, 2012, Dresden, Germany.
"3rd Generation Partnership Project; Technical Specification Group Radio Access Network; Study on Minimization of drive-tests in Next Generation Networks; (Release 9)", 3GPP TR 36.805 V9.00 (Dec. 2009), Jan. 5, 2010.
Ericsson et al., "Accessibility measurements for MDT", 3GPP TSG-RAN WG2 #76, R2-116148, Oct. 14-18, 2011, San Francisco, CA, USA.
Alcatel-Lucent, "VLR SGs paging retry", SA WG2 Meeting #87, S2-114636 (revision of S2-114578), Oct. 10-14, 2011, Jeju, South Korea.

(56) References Cited

OTHER PUBLICATIONS

"3rd Generation Partnership Project; Technical Specification Group Services and System Aspects; Service accessibility; (Release 11)", 3GPP TS 22.011 V11.2.0 (Dec. 2011), Dec. 31, 2011.
Huawei et al.,"General consideration of EAB in LTE", 3GPP TSG-RAN WG2 Meeting #75, R2-113988, Aug. 22-26, 2011, Athens, Greece.
Motorola, "Solution for Extra Low Power Consumption & Time Controlled", 3GPP TSG SA WG2 Meeting #78, TD S2-101215, Feb. 22-26, 2010, San Francisco, USA.
"3rd Generation Partnership Project; Technical Specification Group Radio Access Network; Evolved Universal Terrestrial Radio Access (E-UTRA); User Equipment (UE) radio transmission and reception (Release 10)", 3GPP STANDARD, 3GPP TS 36.101, V10.3.0, Jun. 21, 2011, pp. 1-237, XP050553331.

* cited by examiner

IN-DEVICE COEXISTENCE INTERFERENCE REPORT CONTROL METHOD AND APPARATUS OF NETWORK IN MOBILE COMMUNICATION SYSTEM

CROSS-REFERENCE TO RELATED APPLICATION(S)

This application is a continuation application of a prior application Ser. No. 14/638,409 filed on Mar. 4, 2015, which is a continuation application of a prior application Ser. No. 13/758,132, filed on Feb. 4, 2013 in the U.S. Patent and Trademark Office, which has issued as U.S. Pat. No. 8,983, 448 on Mar. 17, 2015, and which claimed the benefit under 35 U.S.C. § 119(e) of a U.S. Provisional application filed on Feb. 6, 2012 in the U.S. Patent and Trademark Office and assigned Ser. No. 61/595,646, the entire disclosure of each of which is hereby incorporated by reference.

BACKGROUND OF THE INVENTION

1. Field of the Invention

The present invention relates to a mobile communication system. More particularly, the present invention relates to an in-device coexistence interference report control method of a network in a mobile communication system, the in-device coexistence interference being reported by the terminal to inform the network of interference among heterogeneous radio communication modules coexisting in the terminal.

2. Description of the Related Art

With rapid advances in radio communication technology, the communication system has evolved to meet the requirements of 4th Generation (4G) mobile communication technology such as Long Term Evolution (LTE).

The widespread use of smartphones has increased demand for supplementary wireless technologies such as Wireless Local Area Network (WLAN), Bluetooth, and Global Positioning System (GPS). In order to meet this demand, several communication technologies (e.g., cellular technology (LTE/UMTS), WLAN, Bluetooth, and GNSS/GPS) are being integrated into a single portable device. As a consequence, inter-technology interference problem is emerging as a key issue to be solved. This issue is under discussion in the name of In-Device Coexistence (IDC) in the 3rd Generation Partnership Project (3GPP).

The LTE/UMTS communication technology operates on various frequency bands while the Bluetooth and WLAN operate on the Industrial, Scientific and Medical (ISM) band of 2400~2483.5 MHz. Among the frequency bands assigned for the LTE/UMTS communication, Band 4 (2300~2400 MHz) and Band 7 uplink (2500~2670 MHz) are close to the ISM band used by Bluetooth and WLAN such that the simultaneous operations of the two technology modules cause significant interference to each other, e.g. a signal transmitted by one communication technology module may be received by the other communication technology module in the same device.

This interference can be mitigated in such a way that the terminal reports the interference to the network and thus the network commands handover of the terminal to use another frequency. However, if the network does not understand the interference report message, this means that the terminal transmits the interference report message uselessly, resulting in increase of unnecessary signaling. There is therefore a need of a method to address this issue.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention has been conceived to solve the problems of the prior art and it is an object of the present invention to provide a method for preventing a terminal equipped multiple heterogeneous communication modules (e.g. 3G/4G cellular communication module, Wireless Local Area Network (WLAN) module, Bluetooth module, Global Positioning System (GPS) module, etc.) from transmitting in-device coexistence interference report unnecessarily.

According to an aspect of the present invention, the network controls the IDC interference problem report as follows.

1. The User Equipment (UE) reports device capability including the information on whether the UE supports In-Device Coexistence (IDC) interference indicator transmission.

2. The evolved Node B (eNB) transmits to the UE a Radio Resource Control (RRC) connection reconfiguration message informing on whether IDC interference indicator transmission is permitted.

a. Indicator indicating whether IDC interference indicator transmission is permitted b. If permitted, information on the frequency to which the indicator is applied (e.g. send IDC interference indication on only frequency X)

3. The UE transmits IDC interference indicator only when it is permitted

4. The target eNB determines whether to transmit IDC interference indicator transmission, including step 2, in Handover command.

In accordance with an aspect of the present invention, a control message transmission method of a terminal in a mobile communication system is provided. The method includes determining, when a terminal capability enquiry message is received from a base station, whether the base station supports an IDC interference report, transmitting, when the IDC interference report is supported, a terminal capacity information message to the base station, receiving an RRC connection reconfiguration message including information on whether terminal's IDC interference indicator transmission is permitted from the base station; and transmitting an RRC connection reconfiguration complete message to the base station in response to the RRC connection reconfiguration message.

In accordance with another aspect of the present invention, a method for a base station to control terminal's control message transmission in a mobile communication system is provided. The method includes transmitting a terminal capability enquiry message to the terminal to determine terminal capability, determining, when a terminal capability information message is received from the terminal, whether the terminal capability information message includes an In-Device Coexistence (IDC) interference report capability indicator, determining, when the IDC interference report capability indicator is included, whether to permit the IDC interference indicator transmission; and transmitting, when the IDC interference indicator transmission is permitted, to the terminal a Radio Resource Control (RRC) connection reconfiguration message including information on whether the IDC interference indicator transmission is permitted.

In accordance with another aspect of the present invention, a terminal for transmitting a control message in a mobile communication system is provided. The terminal includes a transceiver for communicating with a base station, and a controller for controlling determining, when a terminal capability enquiry message is received from a base station, whether the base station supports an In-Device Coexistence (IDC) interference report, transmitting, when the IDC interference report is supported, a terminal capacity information message to the base station, receiving a Radio Resource Control (RRC) connection reconfiguration message including information on whether terminal's IDC interference indicator transmission is permitted from the base station, and transmitting an RRC connection reconfiguration complete message to the base station in response to the RRC connection reconfiguration message.

In accordance with another aspect of the present invention, a base station for controlling control message transmission of a terminal in a mobile communication system is provided. The base station includes a transceiver for communicating with a terminal and other nodes of wireless communication systems, and a controller for controlling transmitting a terminal capability enquiry message to the terminal to check terminal capability, determining, when a terminal capability information message is received from the terminal, whether the terminal capability information message includes an In-Device Coexistence (IDC) interference report capability indicator, determining, when the IDC interference report capability indicator is included, whether to permit the IDC interference indicator transmission, and transmitting, when the IDC interference indicator transmission is permitted, to the terminal a Radio Resource Control (RRC) connection reconfiguration message including information on whether the IDC interference indicator transmission is permitted.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
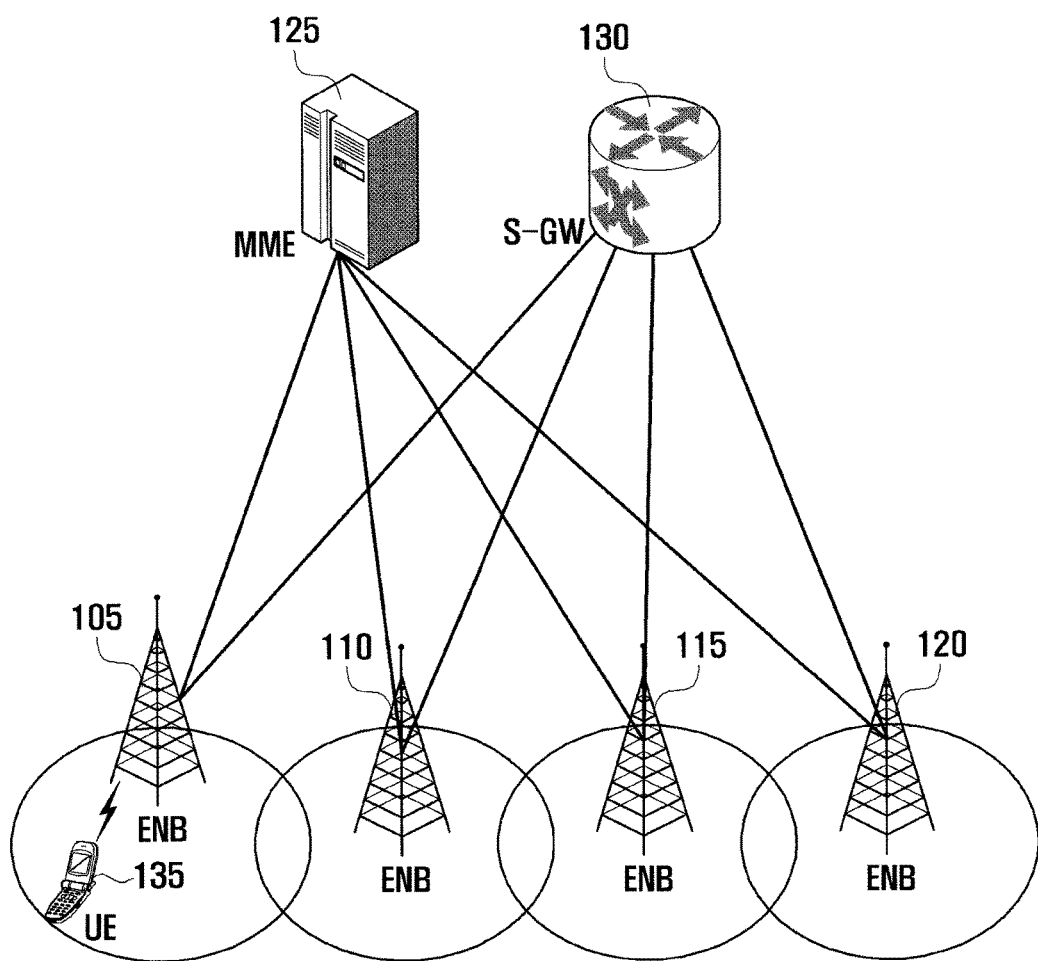
FIG. 1 is a diagram illustrating an architecture of a Long Term Evolution (LTE) system according to an exemplary embodiment of the present invention.

FIG. 1 is a diagram illustrating the architecture of a Long Term Evolution (LTE) system according to an exemplary embodiment of the present invention.

Referring to FIG. 1, the radio access network of the LTE system includes evolved Node Bs (eNBs) 105, 110, 115, and 120, a Mobility Management Entity (MME) 125, and a Serving-Gateway (S-GW) 130. The User Equipment (UE) 135 connects to an external network via eNBs 105, 110, 115, and 120 and the S-GW 130.

In FIG. 1, the eNBs 105, 110, 115, and 120 correspond to legacy node Bs of Universal Mobile Communications System (UMTS). The eNBs 105, 110, 115, and 120 allow the UE establish a radio link and are responsible for complicated functions as compared to the legacy node B. In the LTE system, all the user traffic including real time services such as Voice over Internet Protocol (VoIP) are provided through a shared channel and thus there is a need of a device located in the eNB to schedule data based on the state information, such as UE buffer conditions, power headroom state, and channel state. In order to meet a data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The AMC is a technique for determining the modulation scheme and channel coding rate for the channel condition. The S-GW 130 is an entity to provide data bearers and establishes and releases data bearers under the control of the MME 125. The MME 125 is responsible for various control functions and connected to a plurality of eNBs 105, 110, 115, and 120.

Figure 2:
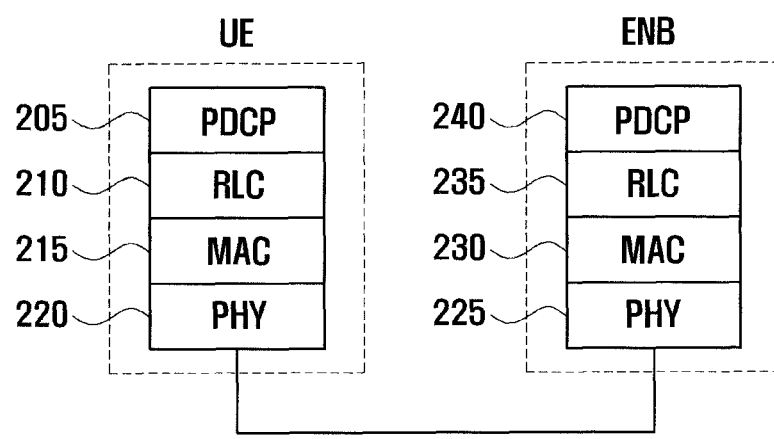
FIG. 2 is a diagram illustrating a protocol stack of an LTE system according to an exemplary embodiment of the present invention.

FIG. 2 is a diagram illustrating a protocol stack of an LTE system according to an exemplary embodiment of the present invention.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression. The RLC 210 and 235 is responsible for segmenting the PDCP Protocol Data Unit (PDU) into segments in appropriate size for Automatic Repeat Request (ARQ) operation. The MAC 215 and 230 is responsible for establishing connection to a plurality of RLC entities so as to multiplex the RLC PDUs into MAC PDUs and demultiplex the MAC PDUs into RLC PDUs. The MAC PDUs are delivered to the PHY 220 and 225. The MAC 215 and 230 demultiplexes the MAC PDUs from the PHY 220 and 225 into RLC PDUs and delivers the RLC PDUs to corresponding RLC entities. The PHY 220 and 225 performs channel coding and modulation on the higher layer data to transmit the modulation result through a radio channel in the form of OFDM symbols and demodulation and channel decoding on the OFDM symbols received through the radio channel to deliver the decoded data to the higher layer. The PHY also performs Hybrid Automatic Repeat Request (HARQ) for additional error correction with the transmission of 1 bit information from the receiver to the sender to indicate whether the packet is received by the receiver successfully. This information is referred to as HARQ ACK/NACK. The downlink HARQ ACK/NACK corresponding to uplink transmission is carried on Physical HARQ indicator Channel (PHICH) while the uplink HARQ ACK/NACK corresponding to downlink transmission is carried on Physical Uplink Control Channel (PUCCH) or Physical Uplink Shared Channel (PUSCH).

Figure 3:
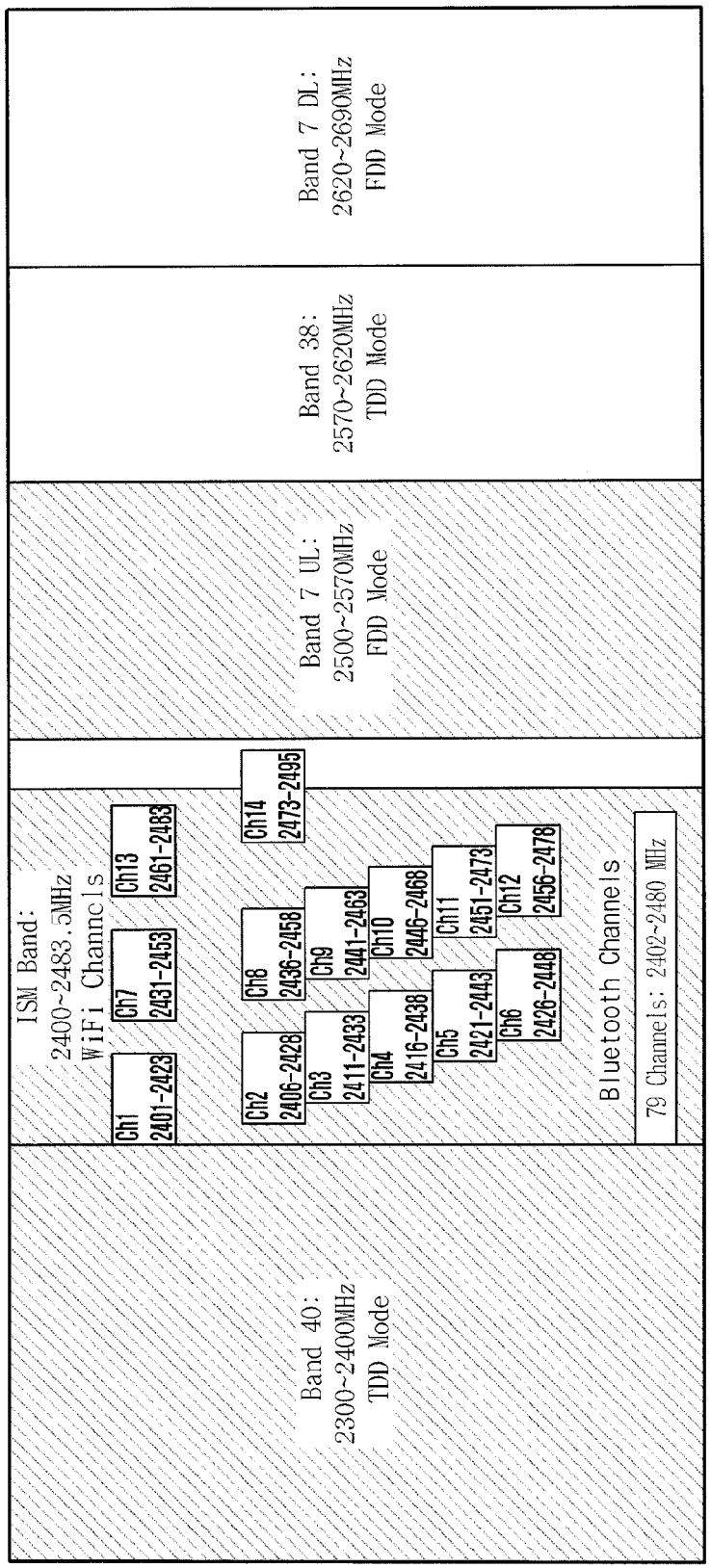
FIG. 3 is a diagram illustrating frequency bands fur use in current $3^{rd}$ Generation Partnership Project (3GPP) cellular communication systems that are adjacent to the Industrial, Scientific, and Medical (ISM) band according to an exemplary embodiment of the present invention.

FIG. 3 is a diagram illustrating frequency bands for use in 3GPP cellular communication systems that are adjacent to the Industrial, Scientific, and Medical (ISM) band according to an exemplary embodiment of the present invention.

Referring to FIG. 3, the in-device coexistence interference becomes worse in a situation where a cell uses band 40 and a WLAN uses channel 1 or where the cell uses band 7 and the WLAN uses channel 13 or 14. Such in-device coexistence interference varies dynamically depending on the locations and channels of the cells, the channels of the WLANs, and traffic pattern. Therefore, there is a need of a method for notifying the network of the in-device coexistence interference, and it is preferred to report the inter-vice coexistence interference only when the network is capable of handling the interference.

Figure 4:
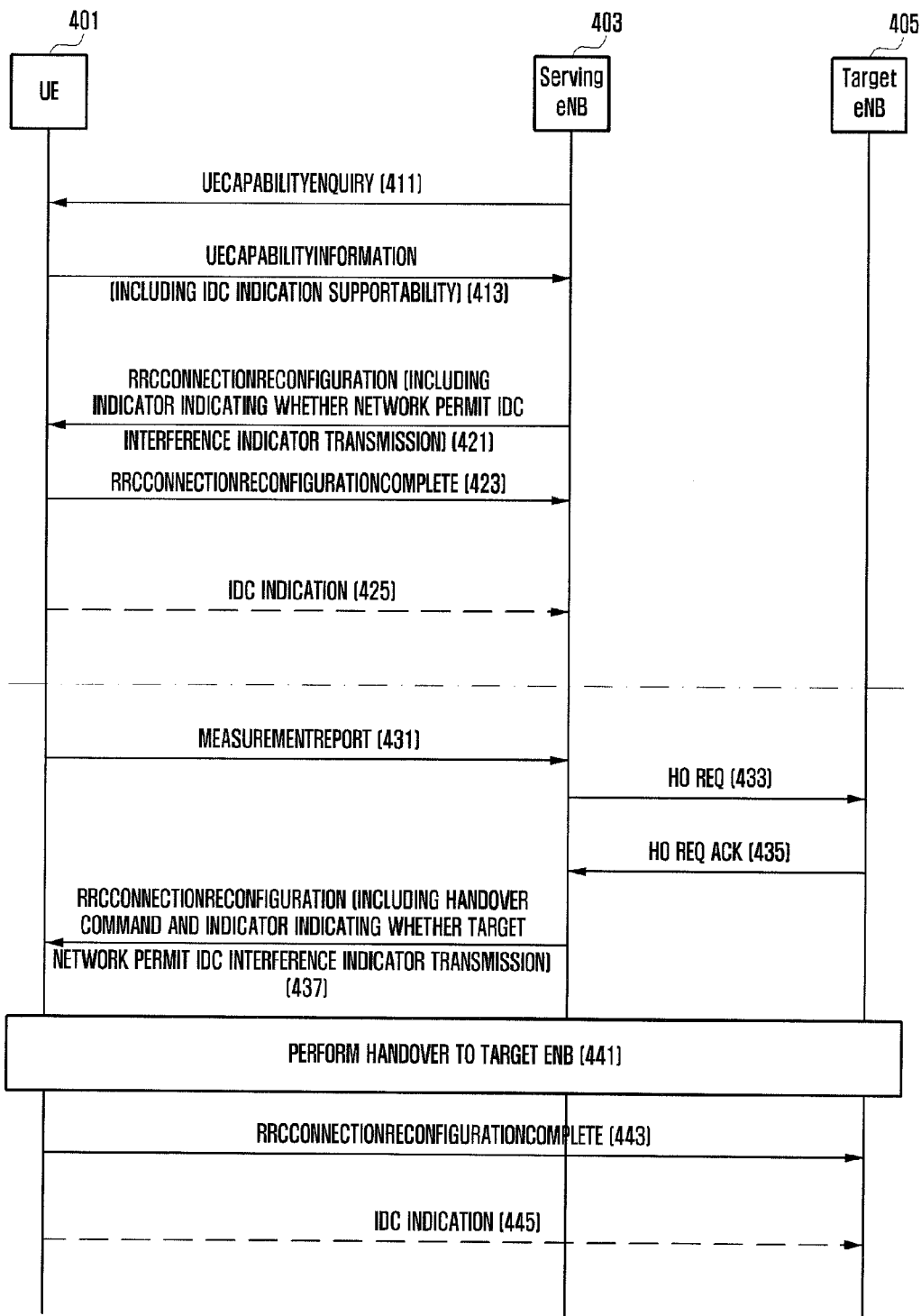
FIG. 4 is a signal flow diagram illustrating signal flows of an in-device coexistence interference indication control method according to an exemplary embodiment of the present invention.

FIG. 4 is a signal flow diagram illustrating signal flows among a UE and eNBs in an in-device coexistence interference indication control method according to an exemplary embodiment of the present invention.

Referring to FIG. 4, the serving eNB 403 sends the UE 401 an RRC message for determining the functions supported by the UE (i.e. UE capability) at step 411. This RRC message may be a UECapabilityEnquiry message.

Upon receipt of the UECapabilityEnquiry message, the UE 401 sends the serving eNB 403 an RRC message including the UE's capability at step 413. This RRC message may be the UECapabilityInformation message. The UECapabilityInformation message includes a parameter indicating supportability of the In-Device Coexistence (IDC) interference (IDC indication or IDC interference indicator, in-device interference between heterogeneous modules) report. This parameter is inDeviceCoexInd.

If the network which has received the UECapabilityInformation message supports the IDC report function, the network may determine the inter-device coexistence interference based on the IDC report and, otherwise, cannot determine the inter-device coexistence interference of the UE, in which case the inDeviceCoexInd parameter is ignored.

Afterward, the serving eNB 403 notifies the UE whether to permit IDC indication transmission of the UE by sending an RRC message at step 421. The RRC message may be the RRCConnectionReconfiguration message, and if the RRCConnectionReconfiguration message includes an otherConfig parameter set to idc-Config, the UE determines that the network can perform the IDC-related process and thus sends the network the IDC interference indicator. Since the IDC interference indicator is used to report the interference problem between heterogeneous communication modules operating on specific frequencies, the UE recognizes that the UE is permitted to transmit the IDC interference indicator only when the UE can measure the interference among at least two frequencies even though the idc-Config is configured, i.e. measurement object is configured, and then sends an acknowledgement informing of successful receipt of the RRC message at step 423. This acknowledgement message may be the RRCConnectionReconfigurationComplete message.

If the UE has the IDC interference indicator transmission capability and if the network permits IDC interference indicator transmission of the UE, and if in-device coexistence interference is detected, the UE sends the network an IDC interference indicator message at step 425.

Meanwhile, if the received signal strength weakens in the serving eNB 403, the UE 401 measures, under UE-specific conditions, the signal strength of the serving and neighbor eNBs and reports the signal measurement result to the serving eNB 403 for handover at step 431. Upon receipt of the measurement report, the serving eNB 403 sends a neighbor (target) eNB 405 a handover request message at step 433. The serving eNB 403 notifies the target eNB 405 that the UE supports IDC interference indicator report.

Upon receipt of the handover request message, the target eNB 405 sends the serving eNB 403 a handover request acknowledge message at step 435. If the target eNB 405 permits the IDC interference indicator transmission of the UE, the target eNB 405 transmits to the serving eNB 403 a parameter indicating the IDC interference indicator transmission permission in the handover request acknowledgement message.

Upon receipt of the handover request acknowledgement message, the serving eNB 403 sends the UE a message including the indicator indicating whether the target eNB 405 permits the IDC interference indicator transmission at step 437. This message can be the RRCConnectionReconfiguration message.

The UE performs handover to the target eNB 405 and acquires synchronization with the target eNB 405 at step 441 and, if handover has completed successfully, sends the target eNB 405 a handover complete message at step 443.

Similar to step 425, the UE sends the target eNB 405 the IDC interference indicator message reporting the in-device interference problem at step 445 only when the UE has the IDC interference indicator transmission capability and the target eNB permits IDC interference indicator transmission of the UE, if in-device interference is detected between the measured frequencies.

Figure 5:
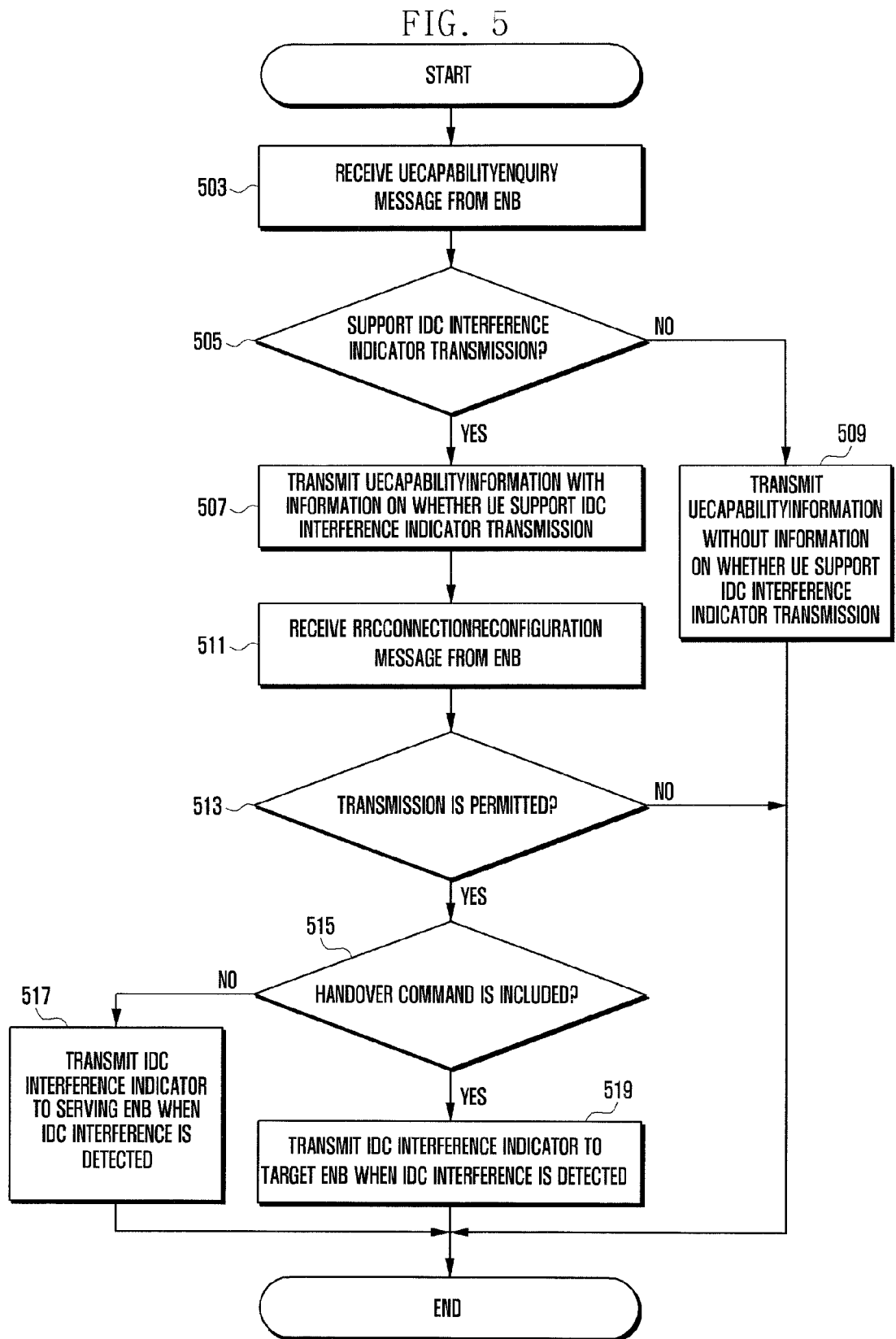
FIG. 5 is a flowchart illustrating a UE procedure of an in-device coexistence interference indication control method according to an exemplary embodiment of the present invention.

FIG. 5 is a flowchart illustrating a UE procedure of an in-device coexistence interference indication control method according to an exemplary embodiment of the present invention.

Referring to FIG. 5, the UE receives the UECapacityEnquiry message from the eNB at step 503. Upon receipt of the UECapacityEnquiry message, the UE determines whether the UE has the IDC interference indicator transmission capability at step 505. If the UE has no IDC interference indicator transmission capability, the UE sends the eNB the UECapabilityInformation message including no IDC interference indicator information at step 509.

Otherwise, if the UE has the IDC interference indicator capability, the UE sends the eNB the UECapabilityInformation message including the information on whether it supports the IDC interference indicator transmission at step 507. The UE receives an RRCConnectionReconfiguration message at step 511. The RRCConnectionReconfiguration message may be used for normal configuration and/or for handover.

If the IDC interference indicator message transmission is permitted with the idc-related configuration in the RRCConnectionReconfiguration message at step 513, the UE determines whether the message includes a handover command at step 515 and, if no handover command is included, sends the serving eNB the IDC interference indicator message informing of the IDC interference at step at step 517. Otherwise if the handover command is included, the UE performs handover to the target eNB and sends the IDC interference indicator message informing of the IDC interference to the target eNB at step 519 rather than the serving eNB.

Figure 6:
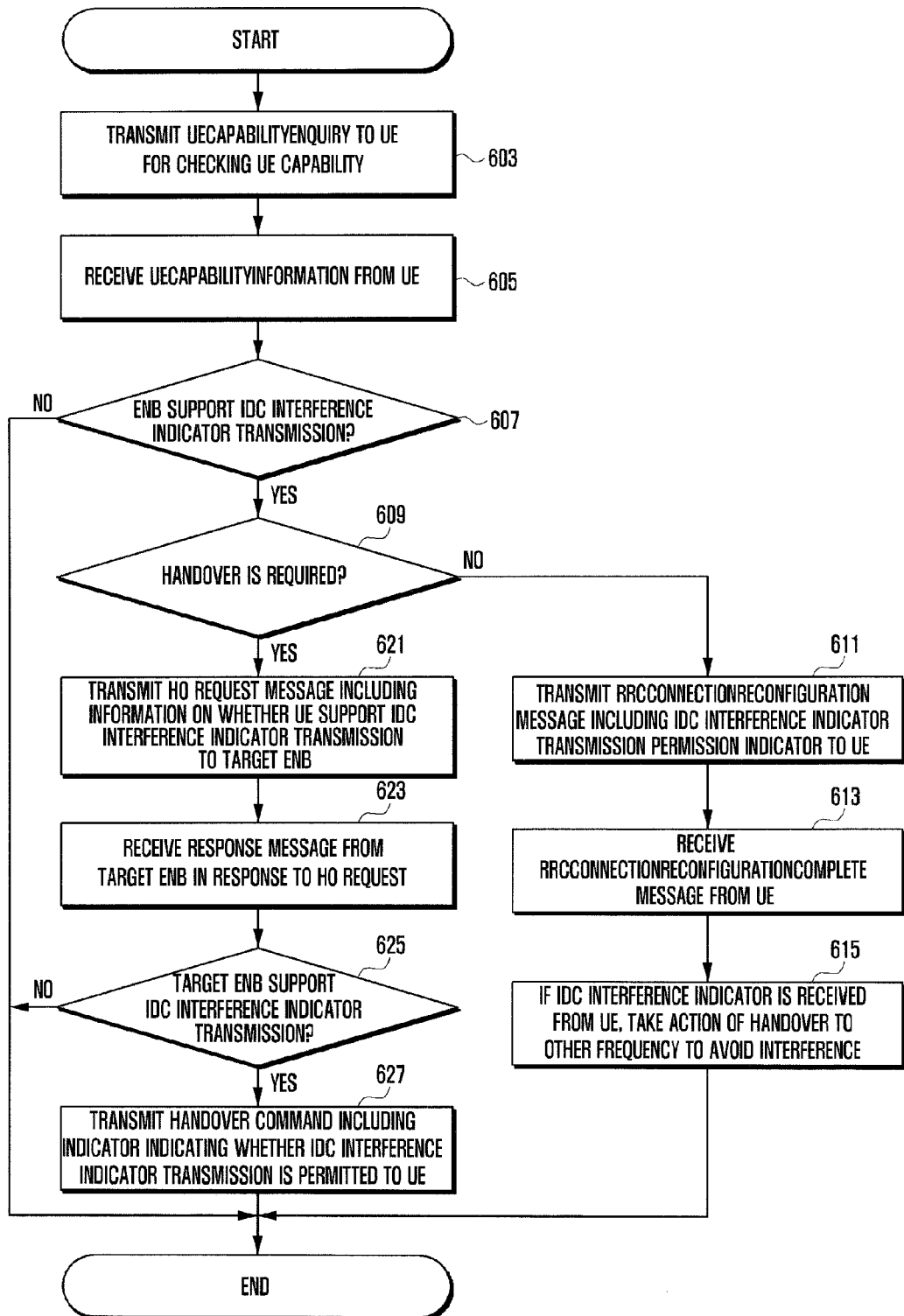
FIG. 6 is a flowchart illustrating an eNB procedure of an in-device coexistence interference indication control method according to an exemplary embodiment of the present invention.

FIG. 6 is a flowchart illustrating an eNB procedure of an in-device coexistence interference indication control method according to an exemplary embodiment of the present invention.

Referring to FIG. 6, if the serving eNB needs to determine the UE capability, the serving eNB sends the UE a UECapabilityEnquiry message to request for the UE capability at step 603. The serving eNB receives a UECapabilityInformation message from the UE in responsetotheUECapabilityEnquiry message at step 605. The eNB determines whether the eNB supports the UE's IDC interference indicator transmission at step 607. If the eNB supports the UE's IDC interference indicator transmission, the serving eNB continues the procedure and, otherwise, ends the procedure.

If the eNB supports the UE's IDC interference indicator transmission, the eNB determines whether the UE's handover is required at step 609. If no UE's handover is required, the eNB sends the UE an RRCConnectionReconfiguration message including the information indicating whether it permits IDC interference indicator transmission at step 611. The eNB receives an RRCConnectionReconfigurationComplete message from the UE in response to the RRCConnectionReconfiguration message at step 613 and, if IDC interference problem occurs at the UE, an IDC interference indicator message is received and the eNB takes an appropriate action (e.g. sends handover command to use another frequency) based on the IDC interference indicator message at step 615.

If the UE's handover is required, the serving eNB sends the target eNB a handover request message including the UE's IDC interference indicator capability information at step 621. The serving eNB receives a handover request acknowledgement message from the target eNB at step 623 and determines whether the target eNB supports the UE's IDC interference indicator transmission at step 625. If the target eNB supports the UE's IDC interference indicator transmission, the target eNB sends the target eNB a handover command including the indicator indicating whether the IDC interference indicator transmission is permitted at step 627.

Figure 7:
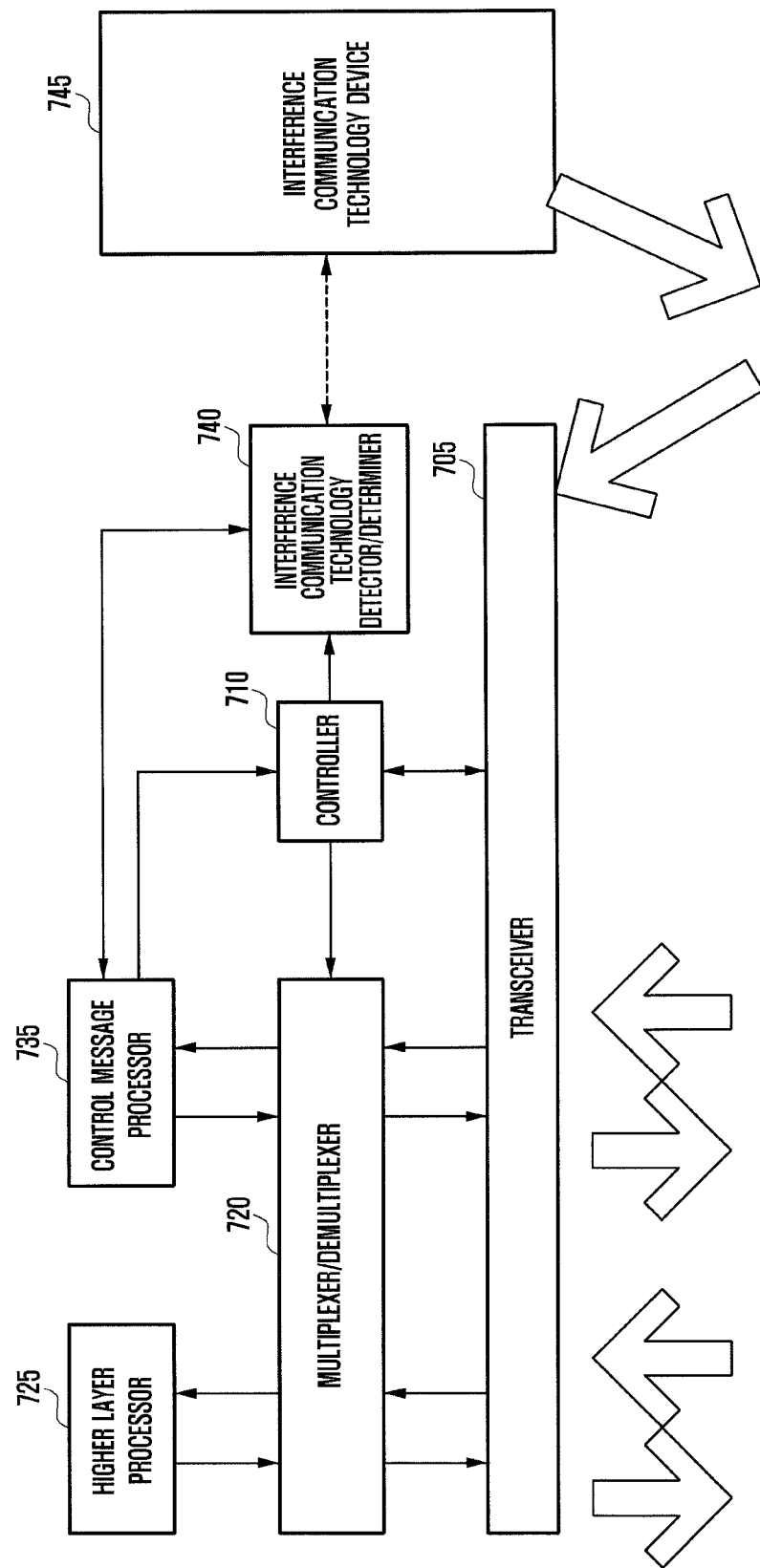
FIG. 7 is a block diagram illustrating a configuration of a UE according to an exemplary embodiment of the present invention.

FIG. 7 is a block diagram illustrating a configuration of a UE according to an exemplary embodiment of the present invention.

As shown in FIG. 7, the UE according to an exemplary embodiment of the present invention includes a transceiver 705, a controller 710, a multiplexer/demultiplexer 720, a higher layer processor 725, a control message processor 730, and an interference communication technology detector/determiner 740.

The transceiver 705 receives data and control signals through a downlink channel of the serving cell and transmits data and control signal through an uplink channel. In the case that multiple serving cells are configured, the transceiver 705 is capable of transmitting and receiving data con control signals through multiple serving cells.

The multiplexer/demultiplexer 720 multiplexes the data generated by the higher layer processor 725 and the control message processor 735 and demultiplexes the data received by the transceiver 705 to deliver the demultiplexed data to appropriate processors, i.e. the higher layer processors 725 and the control message processor 735.

The control message processor 735 processes the control message received form the eNB to takes an appropriate action. For example, if DRX-related parameters are received, the control message processor 735 delivers these parameters to the controller 710.

The higher layer processor 725 is configured per service to process the data generated by a user service such as File Transfer Protocol (FTP) and Voice over Internet Protocol (VoIP), transfer the processed data to the multiplexer/demultiplexer 720, process the data from the multiplexer/demultiplexer 720, and deliver the processed data to the service application running on the higher layer.

The controller 710 determine the scheduling command, e.g. uplink grant, received by the transceiver 705 and controls the transceiver 705 and the multiplexer/demultiplexer 720 to perform uplink transmission with appropriate transmission resource at appropriate timing. The controller 710 also controls the transceiver in association with DRX operation and CSI/SRS transmission.

Exemplary embodiments the present invention have been described above under the assumption that the interference communication technology device 745 includes Wi-Fi, Bluetooth, GPS modules and, according to the explicit interference indication method according to exemplary embodiments of the present invention, the interference communication technology detector 740 determines the interference and supportability of the network to determine whether to transmit and IDC interference indicator message.

The above-describe function may be implemented in the controller 710 and, in this case, the controller is capable of receiving the UE capability enquiry message, determining whether the UE supports the in-device interference report capability, and transmitting the UE capability information message including the IDC interference indicator to the eNB. The controller 710 is also capable of controlling to receive the RRC Connection Reconfiguration message including the information indicating whether the UE's IDC interference indicator transmission is permitted from the eNB and transmit the RRC Connection Reconfiguration Complete message to the eNB in response to the RRC Connection Reconfiguration message. The controller 710 is also capable of determining whether in-device coexistence interference occurs in the UE and, if so, controlling to transmit the IDC interference indicator to the eNB.

According to an exemplary embodiment of the present invention, the controller 710 is capable of processing the handover command transmitted by the eNB and, in this case, the handover command is capable of including an indicator indicating whether the target network permits the IDC interference indicator transmission.

According to an exemplary embodiment of the present invention, the RRC Connection Reconfiguration message is capable of further including information on the frequency to which the IDC interference indicator is applied.

Figure 8:
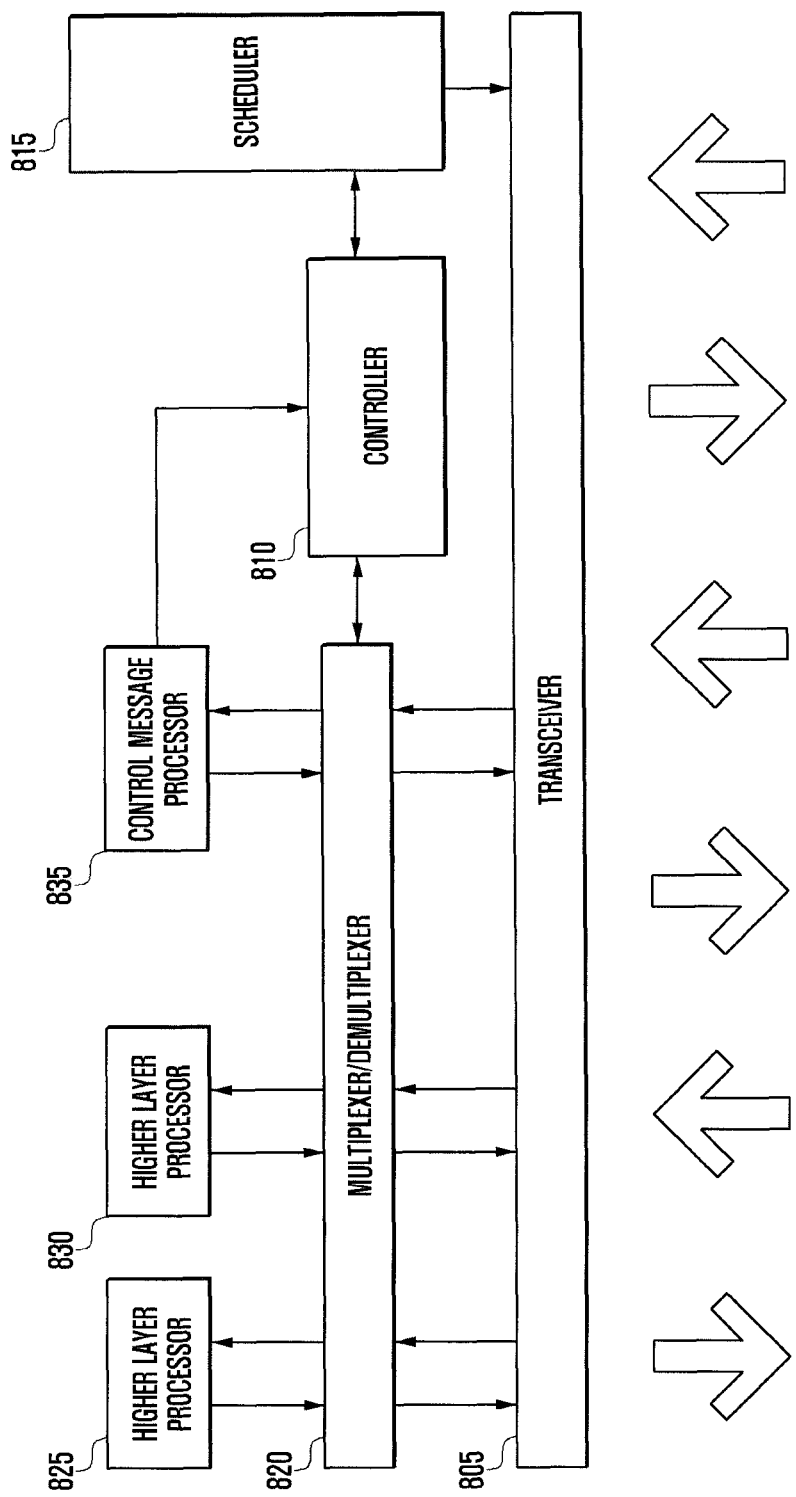
FIG. 8 is a block diagram illustrating a configuration of an eNB according to an exemplary embodiment of the present invention.

FIG. 8 is a block diagram illustrating a configuration of an eNB according to an exemplary embodiment of the present invention.

Referring to FIG. 8, the eNB according to an exemplary embodiment of the present invention includes a transceiver 805, a controller 810, a scheduler 815, a multiplexer/demultiplexer 820, various higher layer processors 825 and 830, and a control message processor 835.

The transceiver 805 transmits data and control signals on a downlink carrier and receives data and control signals on an uplink carrier. In the case that multiple carriers are configured, the transceiver 805 transmits and receives the data and control signals on the multiple carriers.

The multiplexer/demultiplexer 820 multiplexes the data generated by the higher layer processors 825 and 830 and the control message processor 835 and demultiplexes the data received by the transceiver 805 to deliver the demultiplexed data to at least one of the higher layer processors 825 and 830 and the control message processor 835 and the controller 810. The control message processor 835 processes the message transmitted by the UE and takes a necessary action or generates a control message to be transmitted to the UE to the higher layer.

The higher layer processors 825 or 830 are configured per UE per service to process the data generated by a user service such as File Transfer Protocol (FTP) and Voice over Internet Protocol (VoIP), and transfer the processed data to the multiplexer/demultiplexer 820, process the data from the multiplexer/demultiplexer 820, and deliver the processed data to the service application running on the higher layer.

The controller 810 determines the UE's CSI/SRS transmission timing and controls the transceiver based on the determination result.

The controller 810 transmits a UE capability enquiry message to the UE and, if a UE capability information message is received from the UE, determines whether the UE capability information message includes the heterogeneous communication module interference occurrence indicator (IDC interference indicator). If the IDC interference indicator is included, the controller 810 determines whether the UE's IDC interference indicator transmission is permitted and, if so, transmits to the UE an RRC connection reconfiguration message including the information indicating whether the UE's IDC interference indicator transmission is permitted.

The controller 810 also determines whether UE's handover is required and, if so, controls to transmit to the target eNB a handover request message including the information on whether the UE's IDC interference indicator transmission capability. The controller 810 receives a handover request acknowledgement message including the information on whether the target eNB supports the IDC interference indicator transmission from the target eNB and, if the target eNB supports the IDC interference indicator transmission, controls to transmit to the UE a handover command message including the indicator indicating whether the target eNB supports the IDC interference indicator transmission.

The scheduler 815 allocates transmission resource to the UE at an appropriate time in consideration of the buffer status of the UE, channel status, and active time of the UE, and controls the transceiver to process the signals transmitted by the UE or to be transmitted to the UE.

As described above, the in-device coexistence interference indication control method according to exemplary embodiments of the present invention is capable of preventing the UE from transmitting useless in-device coexistence interference indication message, resulting in reduction of unnecessary signaling.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling of a base station a transmission of control message for a user equipment (UE) in a mobile communication system, the method comprising:
receiving, from the UE, first information indicating whether the UE supports an in device coexistence (IDC) indication, wherein an IDC associated with the IDC indication is an interference between multiple radio transceivers in the UE;
transmitting, to the UE, configuration information corresponding to the IDC indication; and
receiving the IDC indication from the UE of which the configuration information is set to setup and an IDC problem is experienced.

2. The method of claim 1, further comprising:
transmitting a handover command to the UE,
wherein the handover command includes information on whether transmission of the IDC indication for a target network is set to setup or not.

3. The method of claim 1, wherein the first information indicating whether the UE supports the IDC indication is an inDeviceCoexInd parameter.

4. The method of claim 1, further comprising:
transmitting second information on a frequency to which an IDC interference indication is applied.

5. A base station for controlling a transmission of control message for a user equipment (UE) in a mobile communication system, the base station comprising:
a transceiver configured to transmit and receive signals; and a processor configured to:
control to receive, from the UE, first information indicating whether the UE supports an in device coexistence (IDC) indication, wherein an IDC associated with the IDC indication is an interference between multiple radio transceivers in the UE, transmit, to the UE, configuration information corresponding to the IDC indication, and receive the IDC indication from the UE of which the configuration information is set to setup and an IDC problem is experienced.

6. The base station of claim 5, wherein the processor is further configured to control to transmit a handover command to the UE, and wherein the handover command includes information on whether transmission of the IDC indication for a target network is set to setup or not.

7. The base station of claim 5, wherein the first information indicating whether the UE supports the IDC indication is an inDeviceCoexInd parameter.

8. The base station of claim 5, wherein the processor is further configured to control to transmit second information on a frequency to which an IDC interference indication is applied.

* * * * *